Feb. 19, 1929.
E. LANGDON
1,702,639
NONSKID TIRE
Filed May 21, 1927
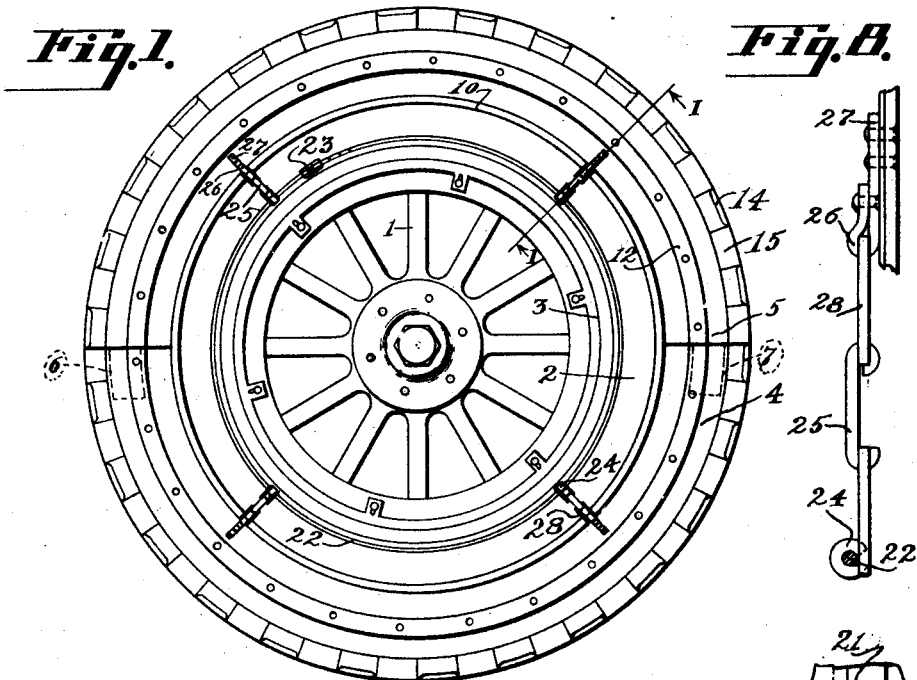
Inventor
EMIL LANGDON.
By A. S. Paré
Atty.

Patented Feb. 19, 1929.

1,702,639

UNITED STATES PATENT OFFICE.

EMIL LANGDON, OF SAN FRANCISCO, CALIFORNIA.

NONSKID TIRE.

Application filed May 21, 1927. Serial No. 193,082.

This invention relates to improvements in non-skid tires, and more particularly to attachments to pneumatic automobile tires, to prevent skidding and side slip.

Among the objects of this invention one is to provide a detachable armor for automobile tires that can be easily attached and detached therefrom.

A further object is to provide such armor with a tread portion, adapted to interpose novelly constructed and arranged friction portions between the tire and the pavement, to prevent skidding and side slip on wet or slippery pavements.

Other objects and advantages will appear as this description progresses. In this specification and the annexed one sheet of drawings, the invention is illustrated in the form considered to be the best, but it is to be understood that the invention is not limited to such form, because it may be embodied in other forms and it is to be understood that in and by the claims following the description, it is desired to cover the invention in whatsoever form it may be embodied.

In the drawings:—

Figure 1, is a side elevation of an automobile wheel and pneumatic tire, having my invention applied thereto.

Figure 2, is a fragmentary detail view in cross section of the same taken on the line 1—1 of Figure 1.

Figure 3, is a fragmentary enlarged detail view of the non-skid tread.

Figure 4, is a similar view of the reinforcing band taken on the line 2—2 of Figure 2.

Figure 5, is a fragmentary enlarged elevation of the tread portion showing the joint in the section armor.

Figure 6, is a similar view showing the metal inserts in the tread.

Figure 7, is a fragmentary enlarged detail in side elevation showing the curled edge of the armor and a face view of the attaching hooks and chain.

Figure 8, is a side elevation enlarged of Figure 7.

In detail the construction illustrated in the drawings comprises the wheel 1, having the pneumatic tire casing 2 mounted on the rim 3, in the conventional manner. The armor comprises an annulus, semicircular in cross section and divided into two armor segments 4 and 5. These segments are composed of sheet metal. The segment 5 has end extensions 6 and 7 shown in dotted lines in Figs. 1 and 5 that extend beneath the contiguous ends of the segment 4, to form, in effect, a continuous annulus. The outside of the armor is covered with friction cloth 8, that on the outsides of the segments being clinched beneath the curled edges 10. The friction cloth 8, cemented to the outer surface of the armor, acts as the adhesive foundation to receive the thick tread 11. Tread 11 is composed of rubber and is vulcanized to the cover 8. The cover 8 is cut on the bias and worked down to a smooth adhesion with the armor, as is the practice in building up pneumatic tire casings of similar material.

To protect this outer cover 8 from abrasion and to give it added strength and adhesion to the armor, the reinforcing strips 12 and 13 are riveted to the armor on opposite sides of the tread, see Figures 1, 2 and 4.

The tread 11—14 is composed of a continuous circumferential body of compounded tread rubber, vulcanized to the strip 8 and partly surrounding the non-skid blocks 15. These blocks 15 are composed of metal, fixed to the armor by the screw 16, and uniformly spaced around the circumference of the tread on opposite sides, see Figures 1 and 2. The inner edges of the blocks are inclined and extend slightly under the rubber tread at 17. Between these blocks the rubber tread is below the tread surface of the blocks, as at 18, to expose the front, side and rear edges 19, 20 and 21, of the blocks 15. The edges 19 and 21 increase traction in soft road surfaces and resist skidding forward when the brakes are applied, while the automobile is moving forward or reversing. The lateral edge 20, prevents side slip, under sudden application of the brakes. While the rubber tread 14 tends to slip or skid on wet pavements, the metal surface of the blocks 15 insures a secure frictional contact with the road surface under traction, insuring safe progress under power and sure stopping under application of the brakes.

The armor is attached to the wheel by the adjustable rings 22, having their ends joined by the adjusting coupling 23. These rings are placed on both sides of the wheel, concentric with the rim 3. The slidable links 24 are strung on the rings 22 by means of hooks 25. Links 26 are formed on the plates 27, which are riveted to the edge of the armor above the curled edge 10. These links are joined together by the chain links 28, the opposite ends of which engage their respective hooks to fasten the armor securely to the tire. The tension of these chains may be increased by taking up on the coupling 23, to reduce the diameter of the rings.

In applying the armor to the tire, the upper segment 5 is placed on the tire; then the wheel is rotated until this segment is under the wheel; then the segment 4 is placed in position; then the rings 22 are placed in position and the chains 28 connected up. The attachment and detachment of this invention to the tire is accomplished without the necessity of jacking up the wheel and with very little effort and time.

The armor may be made in a multiplicity of segments joined by lock seams, as shown in Figure 3, through which the screws 16 extend. But the main segments 4 and 5 joined as described are retained, for the purpose of facilitating application to the tire, as described.

Having thus described my invention, and an embodiment of it, in the full, clear and exact terms required by law, and believing that it comprises novel, useful and valuable improvements in the art to which it pertains, I here state that I do not wish to be limited to the precise construction and arrangements of the several parts, as herein set forth, as the same may be variously modified by a skilled mechanic without departing from the spirit and scope of my invention as defined in the appended claims.

What I claim and desire to secure by Letters Patent of the United States, is the following, to wit:—

1. A non-skid device comprising a plurality of joined segments detachably attachable to a tire, a rubber compound tread fixed to said segment, and metal blocks attached to said segments and exposed in said tread.

2. A non-skid device comprising a plurality of segments in cross section having overlapping ends, and adapted to enclose a tire, a pair of attaching rings; means for detachably attaching said segments to said rings; circumferentially spaced metal tread blocks fixed to said segments and a compound rubber tread partially surrounding said tread blocks.

3. A non-skid device comprising an armor composed of segments in cross section, having overlapping ends and adapted to enclose a tire; an outer layer of fabric covering said armor and clinched in the curled edges of said segments; reinforcing strips fixed to said armor over said covering on opposite sides of the center of said armor; a composite tread composed of metal blocks fixed to said armor and rubber compound fixed to said covering and means for attaching said armor to a tire.

In testimony that I claim the foregoing I have hereto set my hand this 16 day of May, 1927.

EMIL LANGDON.